(12) United States Patent
Garcia De La Peña Razquin

(10) Patent No.: US 9,469,512 B2
(45) Date of Patent: Oct. 18, 2016

(54) LIFTING DEVICE FOR ASSEMBLY AND DISASSEMBLY OF WIND TURBINE COMPONENTS

(71) Applicant: LEUNAMME ENGINEERING SOCIEDAD LIMITADA, Gorriaza, Navarre (ES)

(72) Inventor: Julio Garcia De La Peña Razquin, Gorraiz (ES)

(73) Assignee: LEUNAMME ENGINEERING SOCIEDAD LIMITADA, Gorriaza, Navarre (ES)

( * ) Notice: Subject to any disclaimer, the term of this patent is extended or adjusted under 35 U.S.C. 154(b) by 0 days.

(21) Appl. No.: 14/138,005

(22) Filed: Dec. 21, 2013

(65) Prior Publication Data

US 2015/0298943 A1   Oct. 22, 2015

Related U.S. Application Data

(63) Continuation-in-part of application No. PCT/ES2012/000171, filed on Jun. 15, 2012.

(30) Foreign Application Priority Data

Jun. 20, 2011   (ES) .................. P201100744

(51) Int. Cl.
*B66C 23/16*   (2006.01)
*B66C 23/20*   (2006.01)
*F03D 1/00*   (2006.01)

(52) U.S. Cl.
CPC ............. *B66C 23/207* (2013.01); *F03D 1/001* (2013.01); *F03D 1/003* (2013.01); *F05B 2230/61* (2013.01); *Y02E 10/728* (2013.01); *Y02P 70/523* (2015.11)

(58) Field of Classification Search
None
See application file for complete search history.

(56) References Cited

U.S. PATENT DOCUMENTS

| | | | | |
|---|---|---|---|---|
| 4,491,196 A * | 1/1985 | Bocker | ..................... | B66B 9/16 182/102 |
| 4,512,440 A * | 4/1985 | Bixby | ....................... | B66B 9/16 182/134 |
| 4,793,437 A * | 12/1988 | Hanthorn | .................. | B66B 9/16 182/102 |
| 7,422,096 B2 * | 9/2008 | Crookston | ............. | B66C 23/36 198/312 |
| 2010/0065524 A1 * | 3/2010 | Stommel | ............... | B66C 23/185 212/270 |

FOREIGN PATENT DOCUMENTS

| | | | | |
|---|---|---|---|---|
| JP | 09202589 | A * | 8/1997 | |
| JP | 2009113922 | A * | 5/2009 | |
| JP | 4751478 | B1 * | 8/2011 | |
| JP | 4854804 | B1 * | 1/2012 | |
| JP | 2012091897 | A * | 5/2012 | |

* cited by examiner

Primary Examiner — Gregory Adams
(74) Attorney, Agent, or Firm — Lucas & Mercanti, LLP

(57) ABSTRACT

An apparatus including a platform and extendable structures engages with a wind turbine tower to provide means for detaching and lowering a wind turbine element, such as a blade, hub, generator, gear, transformer or the like. The same means may be used in reverse to raise a wind turbine element back up for installation. The platform may rotate so as to position the lowered element and itself for connection to a truck as a towable set for transport.

5 Claims, 5 Drawing Sheets

LIFTING DEVICE FOR ASSEMBLY AND DISASSEMBLY OF WIND TURBINE COMPONENTS

RELATED APPLICATIONS

This application is a Continuation in Part of International Application PCT/ES2012/000171, filed Jun. 15, 2012, which claims priority from Spanish application no. P 201 100 744, filed Jun. 20, 2011, and which are hereby incorporated by reference in their entirety.

FIELD OF THE INVENTION

The present inventive concept relates generally to wind turbine equipment, and more particularly to equipment for reconfiguring a wind turbine.

BACKGROUND

In the prior art one or several cranes are used to mount or change wind turbine components such as a blade or the whole rotor. The use of cranes is expensive, resulting in both a high economic cost and long response times resulting from lead time to schedule the availability of multiple cranes as well as of the down time resulting from the us of multiple cranes. Additionally, the use of cranes may be constrained by unfavorable weather, for example stormy or windy conditions. All these requirements may contribute to the wind turbine generator being out of service for more, increasing the down time therefore not generating energy, which implies important losses for the client who operates the wind farm.

SUMMARY

It is an exemplary objective of the inventive concept disclosed herein to provide a method and lifting apparatus for assembly and disassembly of wind turbines components, avoiding the use of cranes, and crane cables and slings.

It is an objective of the present inventive disclosure to streamline the work of installing or removing components in wind turbines. Disclosed is a novel method and mobile elevator apparatus for assembly and disassembly of wind turbine components that can be towed in a trailer or that could be contained or integrated into a vessel or truck. A platform may be elevated over the ground or water surface by extendable arms, an extensible set composed of one or more modules to allow access to the height of the blade where the last module incorporates elements for fastening or holding the turbine components during the maneuver of descent or ascent. The present disclosure provides a method and lifting device for assembly and disassembly of wind turbine components that avoids the use of cranes, and crane cables and slings, in any weather conditions, including strong wind or even stormy conditions.

BRIEF DESCRIPTION OF THE DRAWINGS

The accompanying drawings, which are incorporated herein and constitute part of this specification, illustrate exemplary aspects of the invention, and, together with the general description given above and the detailed description given below, serve to explain features of the invention.

DETAILED DESCRIPTION

Figure 1:
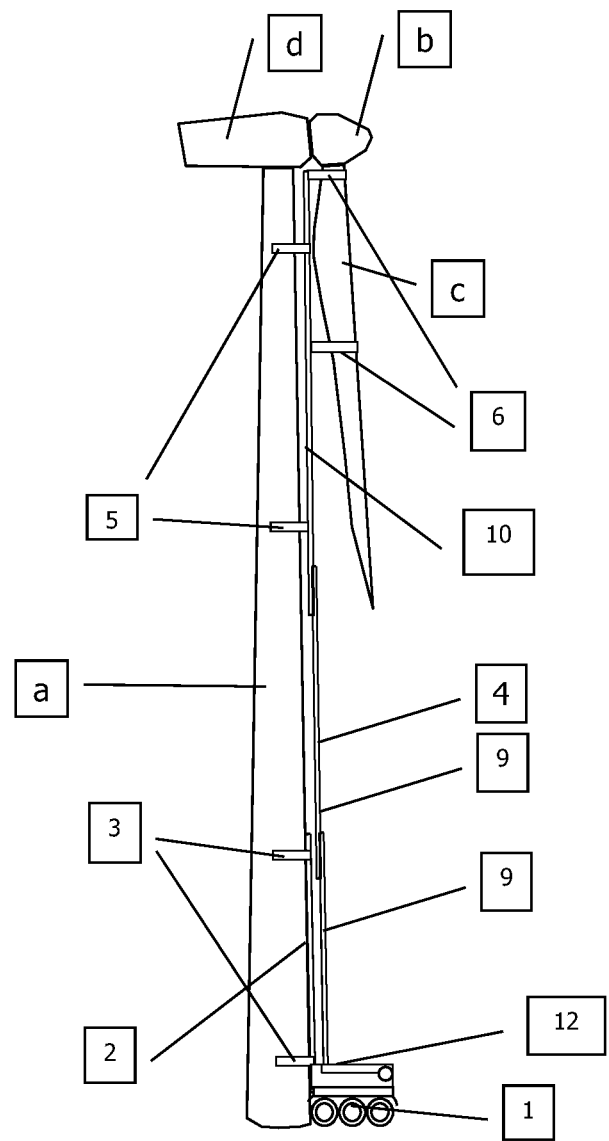
FIG. 1 shows the start of a maneuver of disassembling a subassembly from a wind turbine according to the present invention.

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

In the wind turbine industry, changing a turbine blade is the most frequent maintenance procedure. According the apparatus and method of the inventive concept will be described as removing a turbine blade, though the same apparatus and method may be adapted to replacing other system components, for example a gearbox, generator, converter, transformer, and the like.

The invented device comprises a fixed part and another extendable one that can be towed or be part of a truck. In one embodiment a platform may rotate to facilitate the loading or unloading a truck in the scenario wherein it is not possible with a simple folding down operation from the original position of the blade. In some embodiments the platform incorporates a structure with fixation elements that engage the tower of the wind turbine generator to improve stability during the ascent or descent process.

In some embodiments a platform may also incorporate extending arms that confer greater support and stability by elevating the wheels above ground level.

Once the platform is coupled to the tower and/or the ground, an extendable part of the device begins to rise along the tower until arriving at the root of the blade. For stability, in some embodiments, the module next to the tower comprises two arms with wheels in its ends, which act as stabilizing guides during an ascent or descent procedure.

In one embodiment, once in the upper position, the module includes two clamps, which hold the blade at its root and in mid point. After the blade is secured, the blade may be detached from the hub.

As the blade is lowered down the turbine tower, it is held by the extendable device. Once down, the extendable device, coupled with the blade, is lowered down in front of the platform connected to the tower to position the blade for loading onto the truck. After positioning it on the truck, the platform attached to the tower is folded over the extendable device and blade, and the platform they may all then be towed by the truck.

In some embodiments an additional blade(s) or other equipment may be lowered in a similar process. When the blade is on the truck supports, the two clamps may be opened and the blade left on the truck. The extendable device rotates back towards the platform fixed to the tower. The wind turbine generator rotor may be turned to position the next blade into a vertical position (pointing down) in order to disassemble it.

The previously described method corresponds to the maneuver of disassembling in maintenance operations; the inverse method is applicable for the method of assembly in maintenance or construction operations of the wind turbine generator. The method and device according to the invention enable performing the whole operation without using today's procedures and can achieve the operation under any weather and wind condition The movements of fixation arms, guidance, clamps, extendable part and folding up and down, can be generated by a hydraulic unit, cables, jack ups or any other manual or mechanical driven device. The fixation of the root to the extendable module also can be made through screws or nuts similar to how a blade is normally affixed to its hub.

Looking to FIG. 1, we see the start of the maneuver of disassembling a blade (c) from a wind turbine generator with its main elements, as performed by the lifting device (1). The wind turbine generator comprises a tower (a), hub (b), blade(c) and nacelle (d).

A lifting device (1) is mounted on a truck (FIG. 5: 11) comprises a platform (12) connected to a structure (2) with fixing elements (3) to the tower (a). An extendable set (4) which incorporates several telescopically extendable modules (9, 10), in the case shown two intermediate modules (9) and one last module (10) at the free end of the extendable set (4). The last module (10) has wheels in the ends of its fixing arms (5) to provide guidance and stability during the maneuver, and clamps (6) to hold the blade (c).

The platform (12) may be fixed or rotating. When rotatable, the extendable set (4) of modules (9, 10) can be tilted a certain angle, for example ninety degrees from horizontal.

Still looking to FIG. 1 it can be seen that the lifting device (1) is engaging the tower (a) through the structure (2) and the fixing elements (3). The extendable set (4) is shown expanded to its maximum range and has used the arms with wheels (5) to get guided along the tower (a) to reach the hub (b) with stability and safety. The last module (10) of the extendable set (4) may include clamps (6) for holding the blade (c), thereby allowing workers inside the hub (b) to release the blade (c).

Figure 2:
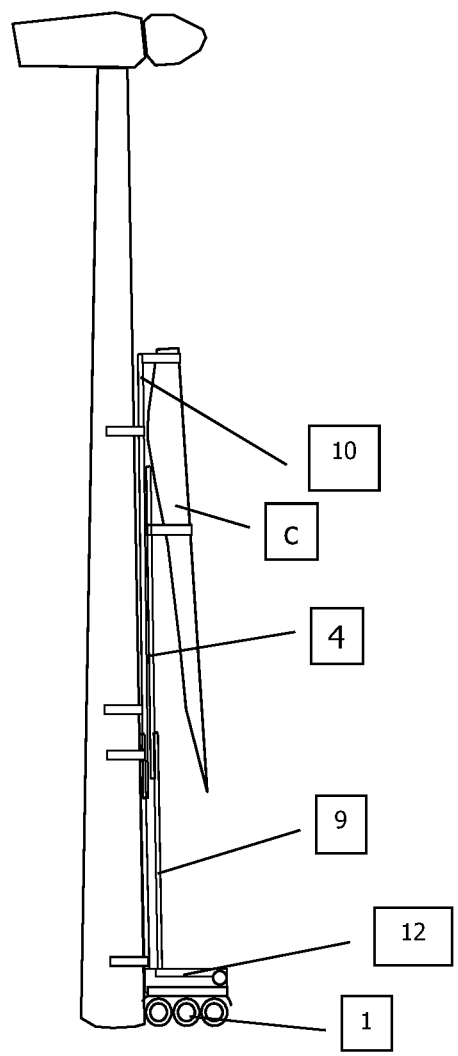
FIG. 2 shows the inventive concept moving the subassembly down a wind turbine tower.

Looking now to FIG. 2, we see the blade (c) is released, the extendable set (4) moving down with the blade (c) attached.

Figure 3:
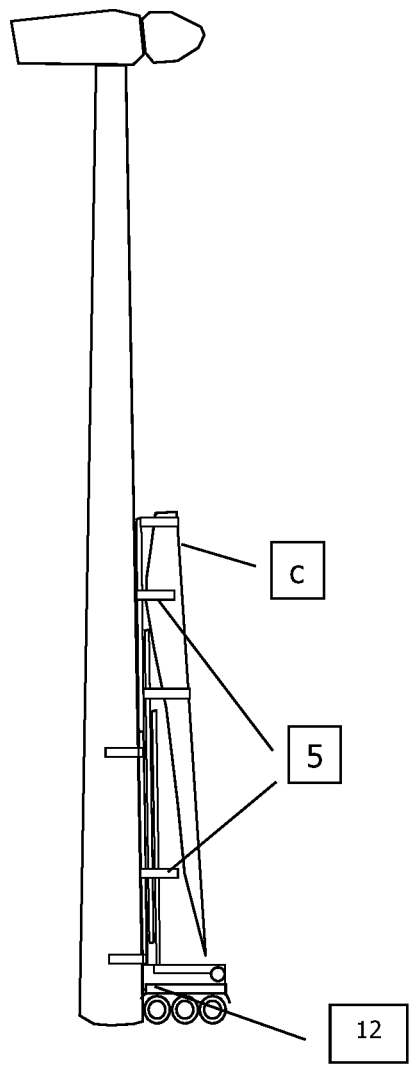
FIG. 3 shows the subassembly engaged by the inventive concept at ground level.

In FIG. 3 the blade (c) continues going down and the fixing arms (5) may be folded to allow the whole set to get to the ground level.

Figure 4:
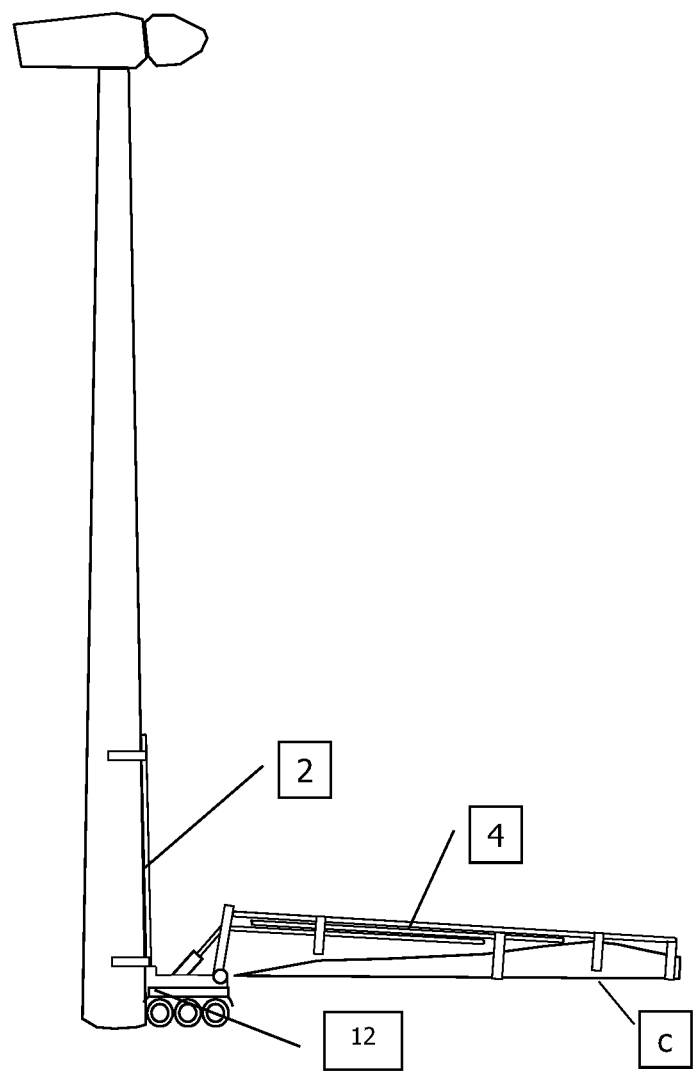
FIG. 4 shows the subassembly being positioned horizontally.
Figure 5:
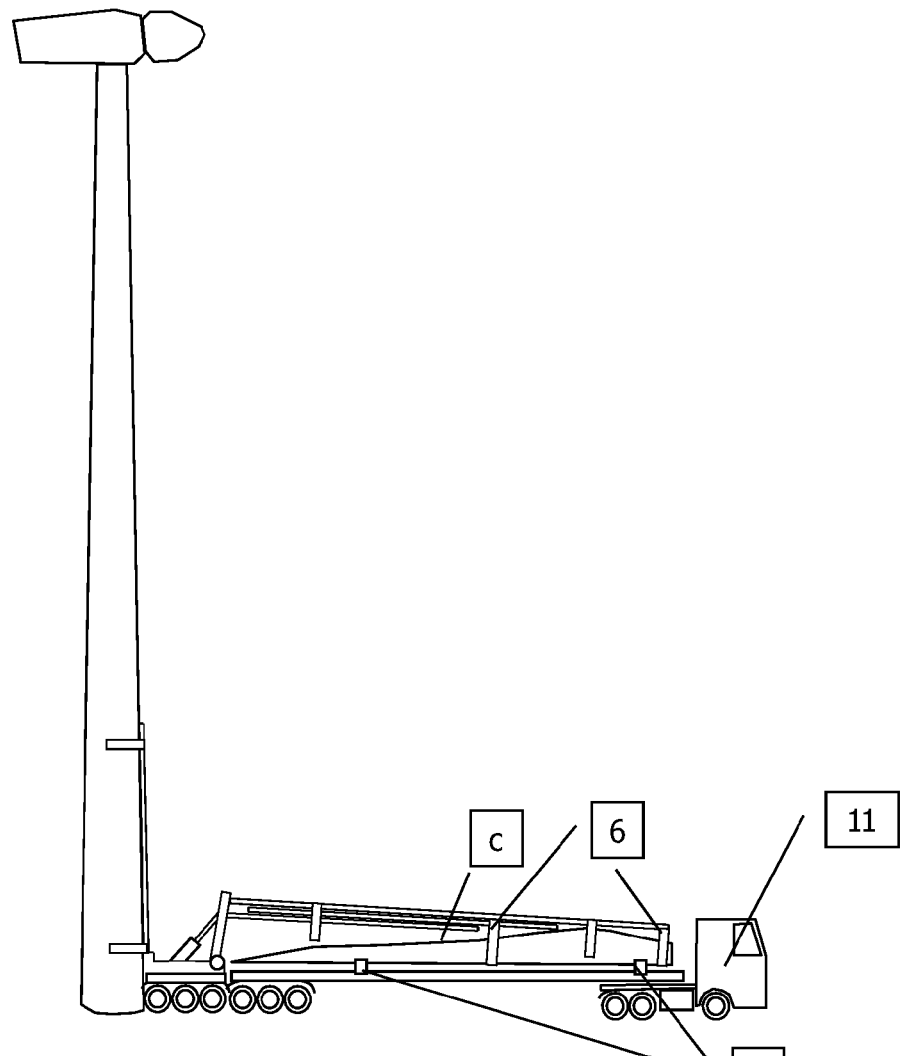
FIG. 5 shows the subassembly placed onto an offloading truck.

As can be seen in FIG. 4, when the blade (c) has reached the ground level, the unit extendable set (4) plus the blade (c) may be folded in front of the unit platform (12) down to the position to load the truck (FIG. 5: 11).

FIG. 5: illustrates the blade (c) laid over the trailer support (7) of the truck (11) and the clamps (6) are opened.

Figure 6:
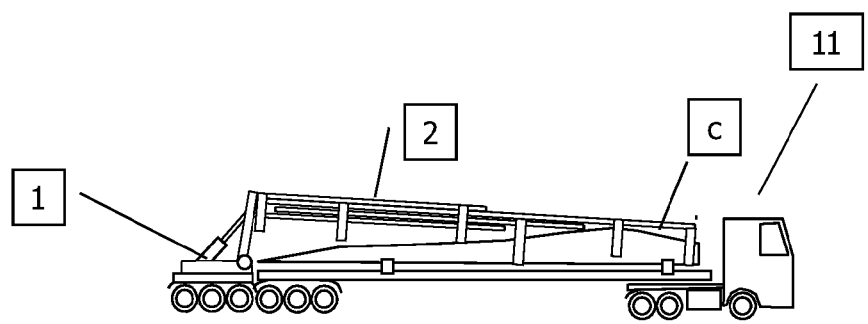
FIG. 6 shows the subassembly configured as a trailer to the offloading truck.

In FIG. 6 we see the structure (2) with the tower fixing elements may be folded over the extendable set (4) plus-blade (c). The lifting device (1) may be attached as a trailer to the truck (11).

What is claimed is:

1. A lifting device to assemble and disassemble turbine components of a wind turbine generator having a nacelle, the lifting device comprising:
a platform adapted to rest proximate a base of a wind turbine tower; and
a plurality of telescoping modules joined to the platform, the plurality of telescoping modules having an extended configuration and a non-extended configuration, the plurality of telescoping modules being adapted to extend upward proximate to a surface of the wind turbine tower, the plurality of telescoping modules including a plurality of first telescoping modules, and a second telescoping module adapted to telescopically extend from the plurality of first modules, the second telescoping module being a highest telescoping module when the plurality of telescoping modules are in the extended configuration, each of the first modules comprising a respective plurality of fixing elements adapted to fix the respective first module in a respective first position relative to the wind turbine tower, the second module comprising a plurality of arms, each arm having one or more wheels, each arm being adapted to extend to a respective second position proximate the wind turbine tower and to dynamically adjust the respective second position of the respective arm relative to the wind turbine tower;
wherein the plurality of telescoping modules are adapted to extend or retract to a vertical position associated with a selected turbine component that needs to be changed or repaired;
wherein the second telescoping module further comprises one or more clamps to hold the selected turbine component during a movement of the second telescoping module.

2. The lifting device according to claim 1, wherein the platform further includes a structure that couples to the tower with one or more second fixing elements.

3. The lifting device according to claim 1, wherein the plurality of arms of the second module apply sustained pressure via the one or more wheels to stabilize, hold and guide the second module along a diminishing diameter of the wind turbine tower thereby maintaining a firm guidance adapted to a diameter of the tower.

4. The device according to claim 1, wherein the plurality of telescoping modules can be tilted down toward the platform to allow loading and unloading of the selected turbine component from a truck or ship carrying the platform.

5. The device according to claim 4, further comprising a plurality of extendable arms adapted to lift two or more truck wheels with respect to the ground level.

* * * * *